(12) United States Patent
Willey et al.

(10) Patent No.: US 7,983,803 B2
(45) Date of Patent: Jul. 19, 2011

(54) APPARATUS AND METHOD FOR PROVIDING IMPROVED WIPER OPERATION

(75) Inventors: Mark R. Willey, Grand Blanc, MI (US); David R. Mick, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 667 days.

(21) Appl. No.: 12/062,362

(22) Filed: Apr. 3, 2008

(65) Prior Publication Data

US 2009/0254219 A1 Oct. 8, 2009

(51) Int. Cl.
*G05D 1/00* (2006.01)
(52) U.S. Cl. .............. 701/1; 701/34; 701/36; 701/49; 318/DIG. 2
(58) Field of Classification Search .............. 701/1, 29, 701/33, 36, 49, 34; 318/443, 483, DIG. 2; 15/250.02, 250.17; 700/275
See application file for complete search history.

(56) References Cited

U.S. PATENT DOCUMENTS

| 6,037,573 A | * | 3/2000 | Arsenault et al. | 219/492 |
| 6,765,631 B2 | * | 7/2004 | Ishikawa et al. | 349/58 |
| 2004/0144911 A1 | * | 7/2004 | Stam et al. | 250/208.1 |

\* cited by examiner

*Primary Examiner* — Gertrude Arthur Jeanglaud
(74) *Attorney, Agent, or Firm* — Ingrassia Fisher & Lorenz

(57) ABSTRACT

Methods and an apparatus are provided for controlling a wiper system of a type that can operate in an automatic mode wherein the wiper system is deactivated automatically and in a manual mode wherein the wiper system is deactivated by a user, the wiper system including at least one wiper configured to move across a surface of a vehicle. The apparatus comprises a motor coupled to the at least one wiper for moving the at least one wiper across the surface and a processor in operable communication with the motor. The processor is configured to detect when the wiper system is operating in the automatic mode and return the at least one wiper to a predetermined position, and deactivate the wiper system, if the wiper system is operating in the automatic mode and the vehicle is turned off.

21 Claims, 3 Drawing Sheets

APPARATUS AND METHOD FOR PROVIDING IMPROVED WIPER OPERATION

TECHNICAL FIELD

The present invention generally relates to vehicle windshield wiper systems, and more particularly relates to an apparatus and a method for providing improved wiper operation in automatic modes; i.e. windshield washing, operation initiated based on moisture detection, etc.

BACKGROUND OF THE INVENTION

Modern automobiles are equipped with wiper systems for removing accumulations of rain, snow, or unwanted debris from a surface of the vehicle, such as the windshield, by moving a wiper across the surface. These wiper systems operate in at least two modes: one which requires the driver to manually deactivate the wipers by moving a latching wiper lever to its OFF position and another in which the wiper system is automatically deactivated when its operation is no longer required. In the first mode, the driver actuates the latching wiper lever to activate and deactivate the wiper system. In the second mode, for example, the vehicle might be equipped with a sensor that activates the wiper system when it detects a predetermined condition, such as an accumulation of moisture on the surface, and deactivates the wiper system automatically when the sensor no longer detects the predetermined condition.

These wiper systems are configured to suspend the movement of the wipers or, in some instances, to continue the movement of the wipers until they reach the beginning of the next wipe cycle when the vehicle is turned off. In either case, unless the wipers are deactivated, they will resume their movement (e.g., return to a park position or continue their movement across the surface) when the vehicle is turned back on.

However, while the vehicle is turned off, conditions on the surface may change in a manner that makes it undesirable for the wipers to resume their movement when the vehicle is turned on. For example, moisture on the surface may evaporate causing the wipers to move across a dry surface when the wiper system resumes its operation, potentially scratching the surface or damaging the wipers. Further, in cold climates, ice may form on the surface during the time that the vehicle is turned off impeding the movement of the wipers when the vehicle is turned back on and potentially harming the wiper system.

One way to prevent undesirable wiper movement when a vehicle is turned on is to automatically deactivate the wipers at the time the vehicle is turned off. However, if the wipers are operating in the first mode, it is undesirable to automatically deactivate the wipers because the latching wiper lever will continue to indicate that they are activated. Rather, in this case, the user must manipulate the latching wiper lever to deactivate the wipers. On the other hand, if the wiper system is operating in the second mode, the wipers may be deactivated automatically because no additional user input is required. Therefore, in order to deactivate the wipers when the vehicle is turned off, it is necessary to determine the mode of operation of the wiper system and return the wipers to the park position and deactivate the wiper system only when they are operating in a mode that permits automatic deactivation.

Accordingly, it is desirable to have an apparatus for determining the mode of operation of a wiper system when the vehicle is turned off and deactivating the wiper system automatically, if the mode of operation permits automatic deactivation. Furthermore, other desirable features and characteristics of the present invention will become apparent from the subsequent detailed description and the appended claims, taken in conjunction with the accompanying drawings and the foregoing technical field and background.

SUMMARY OF THE INVENTION

An apparatus is provided for controlling a wiper system of a type that can operate in an automatic mode wherein the wiper system is deactivated automatically and in a manual mode wherein the wiper system is deactivated by a user, the wiper system including at least one wiper configured to move across a surface of a vehicle. The apparatus comprises a motor that is coupled to the at least one wiper for moving the at least one wiper across the surface and a processor that is in operable communication with the motor. The processor is configured to detect when the wiper system is operating in the automatic mode, and return the at least one wiper to a predetermined position, and deactivate the wiper system, if the wiper system is operating in the automatic mode and the vehicle is turned off.

A method is provided for controlling a wiper system of a type that can be operated in an automatic mode wherein the wiper system is deactivated automatically and in a manual mode wherein the wiper system is deactivated by a user, the wiper system including at least one wiper that is configured to move across a windshield of a vehicle. The method comprises detecting when the wiper system is operating in the automatic mode, returning the at least one wiper to a park position and deactivating the wiper system if wiper system is operating in the automatic mode and the vehicle is turned off.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary, or the following detailed description. Although the schematic diagrams shown herein depict example arrangements of elements, additional intervening elements, devices, features, or components may be present in an actual embodiment. It should also be understood that FIGS. 1-4 are merely illustrative and, particularly with respect to FIGS. 1-3, may not be drawn to scale.

FIG. 1 to FIG. 4 illustrate an apparatus and a method for operating a vehicular wiper system according to one embodiment of the present invention. At the time that a vehicle is turned off, a processor determines whether the wiper system is operating in an automatic mode or in a manual mode. If the wiper system is operating in the automatic mode, the processor moves the wipers to a park position and deactivates the wiper system. If the wiper system is operating in a manual mode, the processor stops the wipers at their current location to provide the driver with a visual indicator that the wiper system is activated. The driver may then deactivate the wiper system by manipulating a wiper control.

Figure 1:
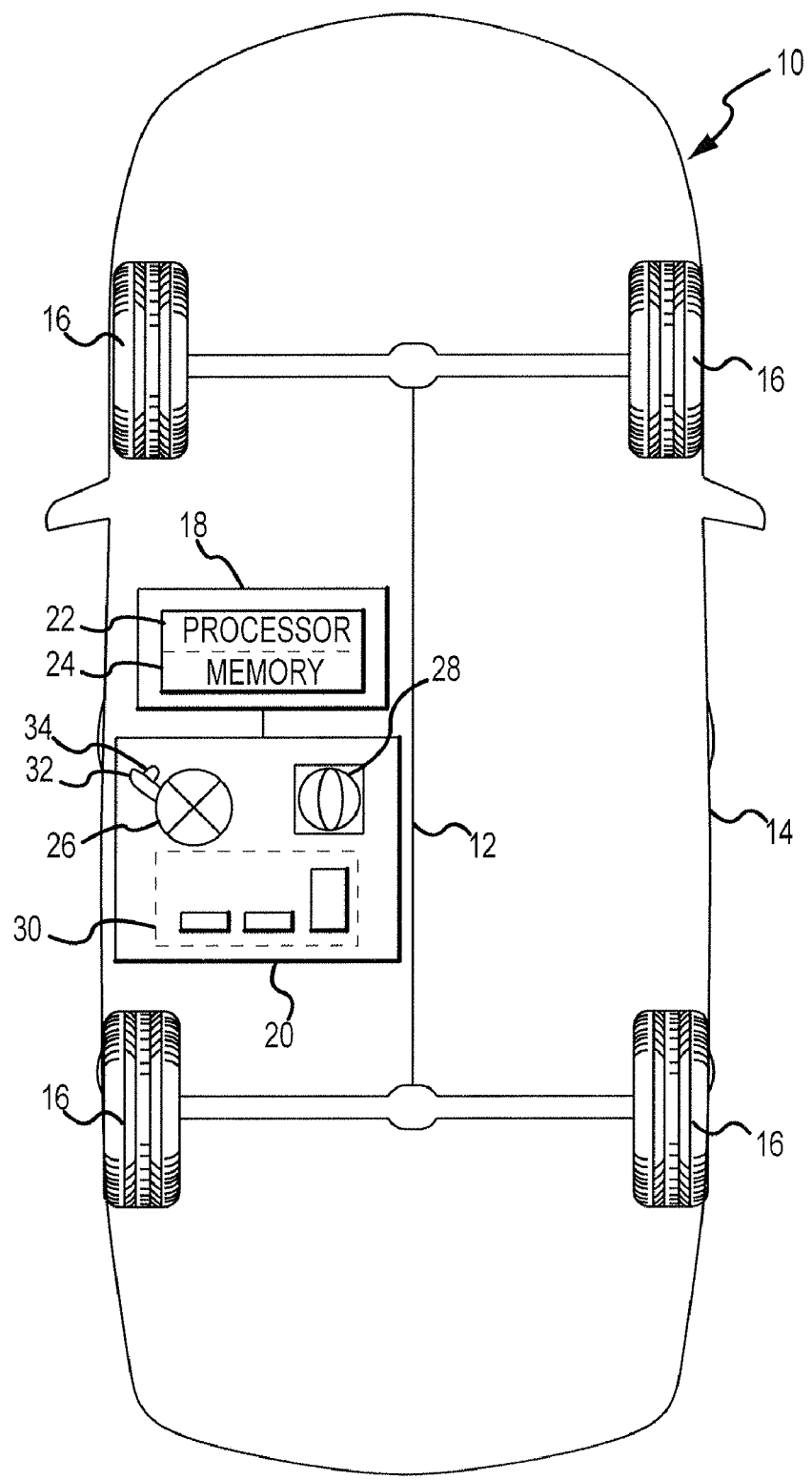
FIG. 1 is a schematic view of an exemplary automobile according to one embodiment of the present invention.

FIG. 1 illustrates a vehicle 10, or "automobile," that is equipped with a wiper system (shown in FIG. 2), according to one embodiment of the present invention. The vehicle 10 includes a chassis 12, a body 14, four wheels 16, an electronic control system (or electronic control unit (ECU)) 18, and a vehicle control system 20. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

Figure 2:
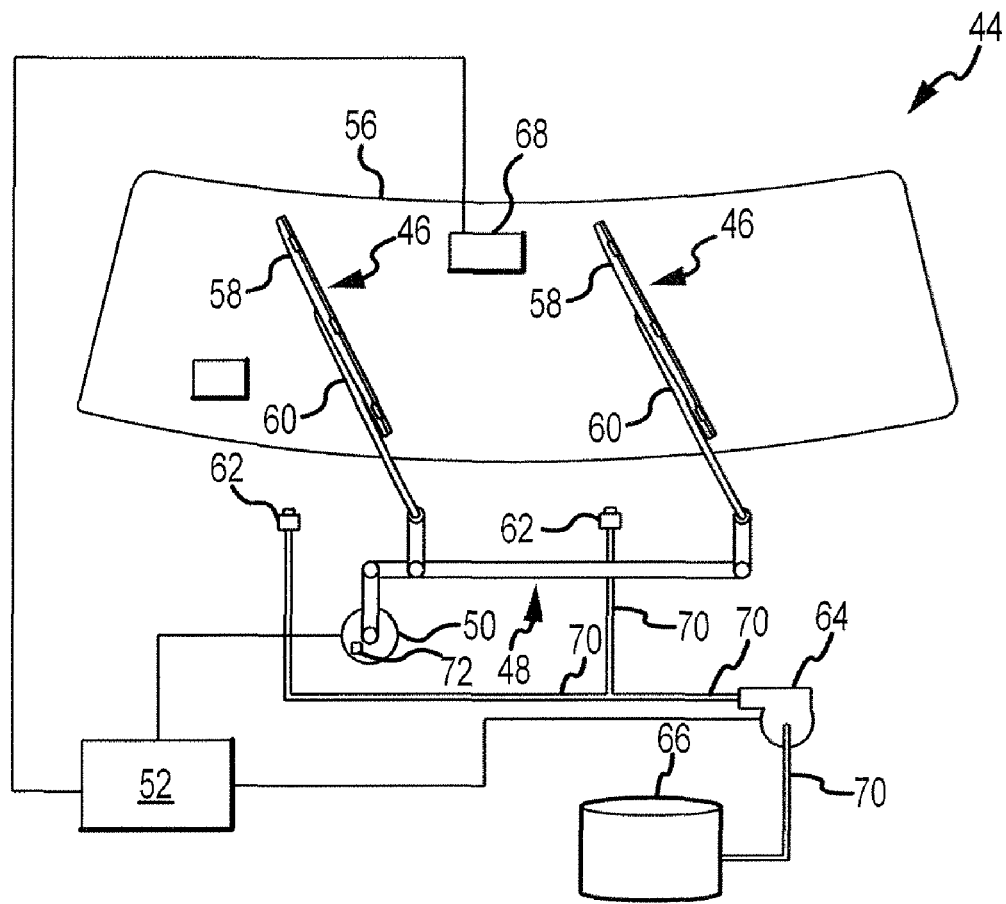
FIG. 2 is a schematic view of a wiper system on the automobile of FIG. 1.

Although not shown in detail, the electronic control system 18 includes various sensors and automotive control modules, or electronic control units (ECUs), such as a body control module (BCM) and a wiper control module (as depicted in FIG. 2), and at least one processor 22, and, in some instances, a memory 24 which includes instructions stored thereon, for carrying out the processes described below. The processor 22 can be a programmable logic control system (PLC), a microprocessor, or any other type of electronic controller known by those skilled in the art. The processor 22 may be comprised of one or more components of a digital and/or analog type and may be programmable by software and/or firmware, a hardwired state-machine, a combination of these, or any other method known to those skilled in the art. It should be noted that a processor 22 may be shared by more than one ECU (e.g., the body control module and the wiper control module) or it may be dedicated and contained within a particular ECU, such as the wiper control module (FIG. 2). Further, in some embodiments the vehicle 10 may have the functionality of the ECUs distributed across several modules and that the wiper, wash motor, and/or pump functionality described below may be controlled by electronics and/or software that is either internal or external to the wiper control module (FIG. 2) and/or the other ECUs.

The vehicle control system 20 is in operable communication with the electronic control system 18 and includes, amongst other components, a steering mechanism (i.e., steering wheel) 26, an ignition switch 28, multiple control pedals (e.g., accelerator pedal, brake pedal, and clutch pedal) 30, and a latching wiper control lever 32 movable between several positions and having a washer fluid control button 34 thereon. The ignition switch 28 is rotatable between a plurality of positions each corresponding to an operational state of the vehicle 10. The wiper system (FIG. 2) of the vehicle 10 only receives electrical power, and is only able to move the wipers (FIG. 2), during certain operational states of the vehicle 10.

Thus, for the purposes of this description, the vehicle 10 is "turned on" when the ignition switch 28 is in a position that corresponds to an operational state of the vehicle 10 in which the wiper system receives electrical power and is able to move the wipers. Further, for the purposes of this description, the vehicle 10 is "turned off" when the ignition switch 28 is in a position that corresponds to an operational state of the vehicle 10 in which the wiper system does not receive power and cannot move the wipers.

FIG. 2 illustrates a wiper system 44 of the vehicle 10, according to one embodiment of the present invention. The wiper system 44 includes a plurality of wipers 46, an arm assembly 48, a wiper motor 50, and a wiper control module 52. The wiper system 44 is configured to move the wipers 46 across a surface of the vehicle 10 to remove accumulated moisture and/or unwanted debris. Although the surface is depicted as the windshield 56 of the vehicle 10 in the illustrated embodiment, it should be understood that the wiper system 44 may be utilized to remove moisture and/or debris from other windows or surfaces of the vehicle 10 as well.

The wipers 46 each include a wiper blade 58 and a wiper arm 60. The wiper arms 60 are connected to the arm assembly 48 and hold the wiper blades 58 against the windshield 56. The arm assembly 48 connects the wiper arms 60 to the wiper motor 50 such that activation of the wiper motor 50 causes the wipers blades 58 to be moved back and forth across the windshield 56. As is commonly understood, the wipers 46 shown in FIG. 2 are in a "tandem" configuration.

The illustrated wiper system 44 also includes washer fluid nozzles 62, a wash motor pump 64, a washer fluid reservoir 66, and at least one moisture sensor 68. The nozzles 62 are positioned and oriented to direct a fluid, such as washer fluid, onto the windshield 56. Fluid lines 70 interconnect the nozzles 62, the pump 64, and the reservoir 66 such that activation of the pump 64 causes washer fluid to be pulled from the reservoir 66 and sprayed onto the windshield 56 through the nozzles 62.

The at least one moisture sensor 68 is in operable communication with the wiper control module 52 and is configured to detect the presence of moisture on the surface of the windshield 56. When the at least one moisture sensor 68 detects a threshold amount of moisture, it transmits a signal to the wiper control module 52 as further described below. The at least one moisture sensor 68 may be any device that is known by one who is skilled in the art for detecting the presence of moisture on a surface.

The wiper control module 52 is in operable communication with the wiper motor 50, the pump 64, the at least one moisture sensor 68. The wiper control module 52 may be integral with another ECU of the electronic control system 18, such as the body control module, or it may be a standalone ECU. Further, the wiper control module 52 may share a processor 22 with another ECU, or it may include its own dedicated processor.

The wiper system 44 may include one or more sensors, positioned, for example, within the wiper motor 50 or on and/or near the windshield 56, for detecting the position of the wiper blades 58 and/or the wiper arms 60, and are also in operable communication with the wiper control module 52. In the embodiment shown, the sensor is a park sensor 72, as is commonly understood, within (or coupled to) the motor 50 to detect when the wiper blades 58 are in the "park" position, as is described below.

The wiper system 44 operates in a plurality of modes, including a manual mode and an automatic mode. Operation of the wiper system 44 in manual mode requires an input, such as the manual manipulation of a control, by the driver of the vehicle 10 (FIG. 1) both to activate and to deactivate the wiper system 44. For example, the wiper system 44 operates in manual mode when the driver of the vehicle 10 actuates the latching wiper control lever 32 (FIG. 1) to one of the various available positions, depending on the desired wiper frequency and/or speed, both to activate and deactivate the wiper system 44.

Figure 3:
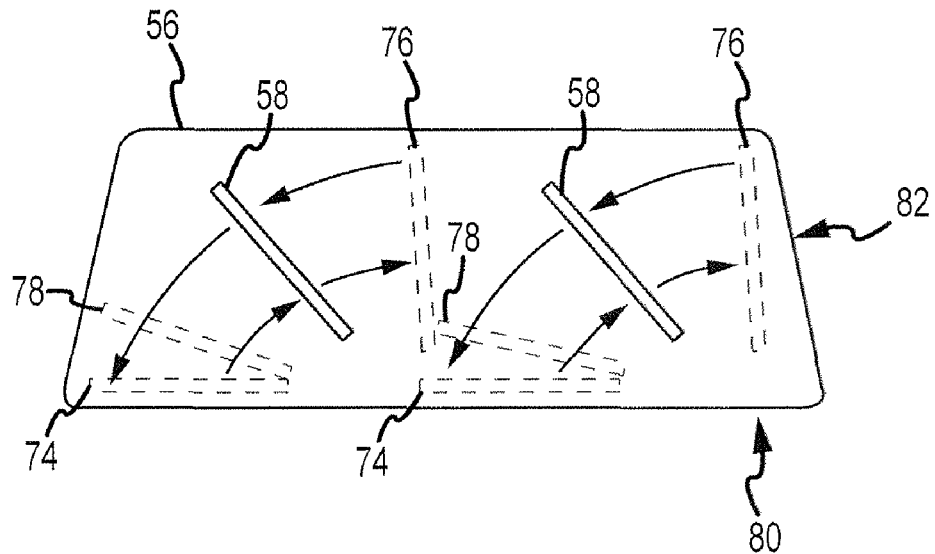
FIG. 3 is a schematic view illustrating the operation of the wiper system of FIG. 2.

FIG. 3 schematically illustrates the windshield 56 and the wiper blades 58 during operation of the wiper system 44 of FIG. 2. Referring to FIGS. 2 and 3, when the driver actuates the latching wiper control lever 32 (FIG. 1), the electronic control system 18 (FIG. 1) communicates with the motor 50, via the wiper control module 52, to move the wiper blades 58 back and forth on the windshield 56. The wiper blades 58 move between a park position 74 and an outwipe position 76 at lower wiper frequencies and/or speeds and an intermediate position 78 and the outwipe position 76 at higher wiper frequencies and/or speeds. The wiper blades 58 remain in the park position 74 when the wiper system 44 is not activated.

In the illustrated embodiment, in the park position 74, the wiper blades 58 are in a substantially horizontal orientation along a bottom edge 80 of the windshield 56. However, in other embodiments the wiper blades 58 may be positioned in other locations, on or off the windshield 56, when they are in the park position. In the intermediate position 78, the wiper blades 58 are angled slightly above their horizontal orientation along the bottom edge 80 of the windshield 56. Finally, in the outwipe position 76, the wiper blades 58 are in a substantially vertical orientation with one of the blades 58 near a central portion of the windshield 56 (or slightly off-center such that the wipe patterns of the blades 58 overlap) and the other blade 58 along a side edge 82 of the windshield 56. The full motion of the wiper blades 58 from the park position 74 to the outwipe position 76 and back at lower wiper frequencies and/or speeds, or from the intermediate position 78 to the outwipe position 76 and back at higher wiper frequencies and/or speeds, defines a "wipe cycle."

In this example, the driver deactivates the wiper system 44 by moving the latching wiper control lever 32 (FIG. 1) to an appropriate position, causing the electronic control system 18 (FIG. 1) to return the wiper blades 58 to the park position 74 by rotating the wiper motor 50 until the park sensor 72 indicates that the blades 58 are parked.

In automatic mode, the wiper system 44 may be activated either automatically or in response to input from the driver of the vehicle 10. In either case, however, the wiper system 44 is deactivated automatically, without requiring additional input from the driver, when it is operating in automatic mode.

In some embodiments, the vehicle 10 includes at least one sensor that causes the wiper system 44 to operate in automatic mode by activating the wiper system 44 when the sensor detects the presence of a predetermined condition and deactivating the wiper system 44 when the predetermined condition is no longer present. For example, returning to FIG. 2 when the at least one moisture sensor 68 detects a threshold amount of moisture on the windshield 56 it communicates with the wiper control module 52 (and/or the electronic control system 18) to rotate the wiper motor 50 and move the wipers blades 58 across the windshield 56. The wiper frequency and/or speed may be adjusted depending on the amount of moisture on the windshield 56. When the at least one moisture sensor 68 no longer detects the necessary amount of moisture, it communicates with the wiper control module 52 (or the electronic control system 18) to deactivate the wiper system 44 and return the wiper blades 58 to the park position 74 (FIG. 3).

In addition, some embodiments of the wiper system 44 also operate in automatic mode when the driver actuates an automatic wiper control that activates the wiper system 44. The wiper system 44 is then deactivated automatically, at a later time, without requiring additional input from the driver. For example, referring to FIGS. 1 and 2, the driver may actuate the washer fluid control button 34 to clean debris from the windshield 56, causing the electronic control system 18 to activate the pump 64, via the wiper control module 52, and spray washer fluid onto the windshield 56.

In order to clear the washer fluid from the windshield 56, as well as assist in the cleaning of the windshield 56, the electronic control system 18 also operates the motor 50, via the wiper control module 52, causing the wiper blades 58 to complete a predetermined number of wipe cycles after the fluid is no longer impacting the windshield. When the predetermined number of wipe cycles is complete, the electronic control system, 18 deactivates the wiper system 44 and returns the wiper blades 58 to the park position 74 (FIG. 3).

Still referring to FIGS. 1 and 2, and as described above, the wiper system 44 is configured to suspend the movement of the wiper blades 58 or, in some embodiments, to continue to the movement of the wiper blades 58 until they reach the intermediate position 78 (FIG. 3), when the vehicle 10 is turned off. Further, unless the wiper system 44 is deactivated first, the wiper blades 58 will resume their movement when the vehicle 10 is turned back on, either to return to the park position 74 (FIG. 3), if the wiper system is operating in automatic mode, or to continue their movement across the windshield 56. However, while the vehicle 10 is turned off, conditions on the windshield 56 may change (e.g., moisture on the windshield may evaporate or form into ice) making it undesirable for the wiper blades 58 to resume their movement when the vehicle 10 is turned back on.

To prevent undesirable movement of the wiper blades 58 when the vehicle 10 is turned on, the wiper system 44 should be automatically deactivated at the time that the vehicle 10 is turned off. This is possible when the wiper system 44 is operating in automatic mode, because no additional input from the driver is necessary to deactivate the wiper system 44. However, the wiper system 44 cannot be deactivated automatically when it is operating in manual mode, because additional input from the driver is required. Consequently, in order to deactivate the wiper system 44 when the vehicle 10 is turned off, it is first necessary to detect whether the wiper system 44 is operating in automatic mode or in manual mode and to handle each case appropriately.

Embodiments of the present invention provide a processor (e.g., the processor 22 of FIG. 1) that is configured to determine whether the wiper system 44 is operating in automatic mode or manual mode when the vehicle 10 is turned off. If the wiper system 44 is operating in automatic mode, the processor 22 returns the wiper blades 58 to the park position 74 (FIG. 3) and deactivates the wiper system 44. If the processor 22 determines that the wiper system 44 is operating in manual mode, it stops the wiper blades 58 at their current location on the windshield 56 to provide the driver with a visual indicator that the wiper system 44 is still activated. Further, in the embodiment described below with regard to FIG. 4, if the wiper blades 58 are in the park position 74 (FIG. 3) and the vehicle is turned off while the wiper system 44 is operating in manual mode, the processor 22 moves the blades 58 to a position on the windshield 56 where they are visible to the driver, to provide the visual indication. The driver may deactivate the wiper system 44 utilizing the manual wiper control.

Figure 4:
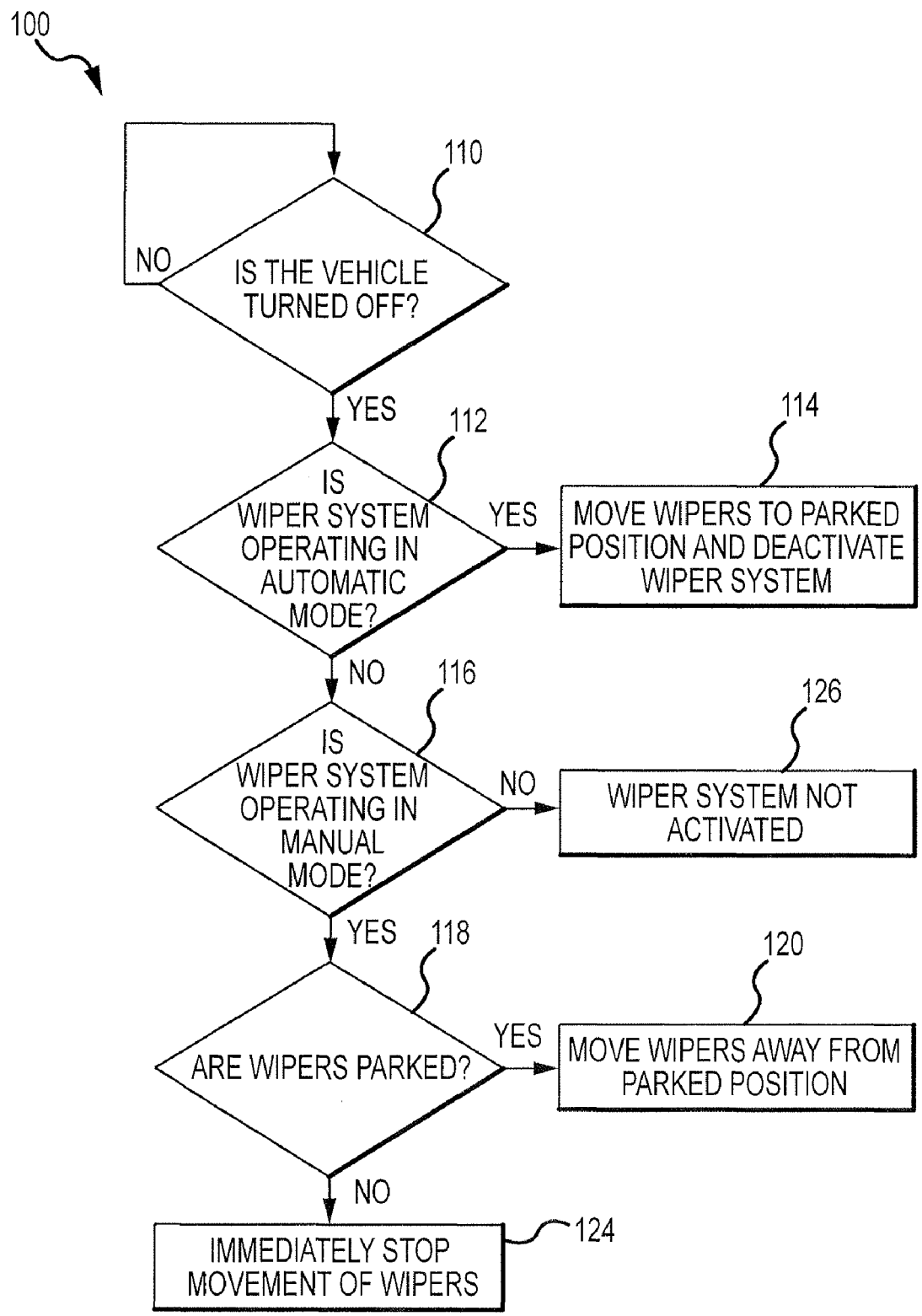
FIG. 4 is a flow chart of an exemplary method for controlling the operation of the wiper system at the time that the vehicle is turned off.

FIG. 4 is a flowchart of an exemplary method 100 for controlling the operation of a wiper system (e.g., the wiper system 44 of FIG. 2) when a vehicle (e.g., the vehicle 10 of FIG. 1) is turned off. It is to be understood that various steps described in conjunction with FIG. 4 may be performed in different orders than the illustrated and described order, and/or some steps may be performed in parallel with each other.

The exemplary method 100 begins with step 110 in which the vehicle is turned off. After the vehicle is turned off, a processor (e.g., the processor 22 of FIG. 1) that is in operable communication with the wiper system determines if the wiper system is operating in automatic mode (step 112). If the wiper system is operating in an automatic mode, the method 100 proceeds to step 114.

During step 114, the processor returns the wiper blades (e.g., the wiper blades 58 of FIG. 2) to the park position (e.g., the park position 74 of FIG. 3) and deactivates the wiper system. For example, referring to FIGS. 1 and 2, during step 114 the processor 22 causes the motor 50 to move the wipers 46 until the park sensor 72 indicates that they are in the park position 74 (FIG. 3). In addition, the processor 22 takes any additional action that is necessary to deactivate the wipers 46.

On the other hand, if the wiper system is not operating in automatic mode during step 112, the processor determines if the wiper system is operating in manual mode (step 116). If the processor is operating in manual mode, the method proceeds to step 118.

During step 118, the processor determines if the wiper blades are in the park position. If the wiper blades are in the park position, the processor moves the wiper blades so that they are visible to the driver and provide a visual indicator that the wiper system is activated (step 120). For example, referring to FIGS. 1 and 2, during step 118 the processor 22 communicates with the park sensor 72 to determine if the wiper blades 58 are in the park position 74 (FIG. 3). If the wiper blades 58 are parked, the processor 22 causes the motor 50 to move the wiper blades 58 away from the park position 74 so that they provide a visual indicator to the driver that the wiper system 44 is activated. In one embodiment, the processor 22 moves the wiper blades 58 away from the park position 74 by running the motor 50 for a short period of time (e.g., 200 milliseconds).

Returning to FIG. 4, if the wiper blades are not in the park position during step 118, the processor immediately stops the movement of the wipers (step 124) leaving the wiper blades at their current location as a visual indicator that the wiper system is activated. It should be noted that in some embodiments, the method 100 always skips directly from step 116 to step 124 if the wiper system is operating in manual mode, without regard for whether the wiper blades are in the park position.

If the processor determines that the wiper system is not operating in manual mode during step 116, then the wiper system is either not operating or is operating in another mode that is not relevant to the method 100 and the method terminates (step 126).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An apparatus for controlling a wiper system of a type that can operate in an automatic mode wherein the wiper system is deactivated automatically and in a manual mode wherein the wiper system is deactivated by a user, the wiper system including at least one wiper configured to move across a surface of a vehicle, the apparatus comprising:
    a motor coupled to the at least one wiper for moving the at least one wiper across the surface;
    at least one sensor for detecting when the at least one wiper is in the predetermined position; and
    a processor in operable communication with the motor and the at least one sensor, the processor configured to:
        detect when the wiper system is operating in the automatic mode;
        return the at least one wiper to a predetermined position, and deactivate the wiper system, if the wiper system is operating in the automatic mode and the vehicle is turned off;
        detect when the wiper system is operating in the manual mode; and
        move the at least one wiper away from the predetermined position if the wiper system is operating in the manual mode, the at least one wiper is in the predetermined position, and the vehicle is turned off.

2. The apparatus of claim 1, wherein the surface is a windshield on the vehicle.

3. The apparatus of claim 1, wherein the processor is further configured to activate the motor for a predetermined length of time to move the at least one wiper away from the predetermined position.

4. The apparatus of claim 2, further comprising:
    at least one sensor in operable communication with the processor for detecting the presence of a predetermined condition, and wherein the processor is further configured to activate the wiper system when the at least one sensor detects the predetermined condition and to deactivate the wiper system when the at least one sensor does not detect the predetermined condition.

5. The apparatus of claim 4, wherein the at least one sensor comprises a moisture detector.

6. The apparatus of claim 2, further comprising:
    an automatic wiper control in operable communication with the processor, and wherein the processor is further configured to activate the wiper system when the automatic wiper control is actuated and deactivate the wiper system after a predetermined condition is satisfied.

7. The apparatus of claim 6, wherein the automatic wiper control comprises a washer fluid control button and the predetermined condition comprises the completion of a predetermined number of wipe cycles by the at least one wiper after the user releases the washer fluid control button.

8. A method for controlling a wiper system of a type that can be operated in an automatic mode wherein the wiper system is deactivated automatically and in a manual mode wherein the wiper system is deactivated by a user, the wiper system including at least one wiper configured to move across a windshield of a vehicle and a wiper motor, the method comprising:
    detecting when the wiper system is operating in the automatic mode; and
    when the wiper system is operating in the automatic mode and the vehicle is turned off, returning at least one wiper to a park position by activating the wiper motor to move the at least one wiper toward the park position; receiving a signal from a park sensor, the park sensor configured to detect when the at least one wiper is in the park position; and deactivating the wiper system.

9. The method of claim 8, further comprising detecting when the wiper system is operating in the manual mode.

10. The method of claim 9, further comprising:
detecting when the at least one wiper is in the park position; and
moving the at least one wiper away from the park position if the wiper system is operating in the manual mode, the at least one wiper is in the park position, and the vehicle is turned off.

11. The method of claim 10, wherein the step of detecting when at least one wiper is in the park position further comprises receiving a signal from a park sensor, the park sensor configured to detect when the at least one wiper is in the park position.

12. The method of claim 10, wherein the moving step further comprises activating a wiper motor for a predetermined length of time to move the at least one wiper away from the park position.

13. A vehicle wiper system of a type having an automatic mode wherein the vehicle wiper system is deactivated automatically and a manual mode wherein the vehicle wiper system is deactivated by a user, the vehicle wiper system comprising:
at least one wiper configured to move across a windshield of a vehicle;
a motor coupled to the at least one wiper and configured to move the at least one wiper between a plurality of positions on the windshield; and
a processor in operable communication with the motor, the processor configured to:
detect when the vehicle wiper system is operating in the automatic mode;
return the at least one wiper to a park position if the vehicle wiper system is operating in the automatic mode and the vehicle is turned off; and
deactivate the vehicle wiper system.

14. The vehicle wiper system of claim 13, further comprising:
a park sensor in operable communication with the processor, wherein the processor is further configured to:
activate the motor;
receive a signal from the park sensor when the at least one wiper is in the park position; and
deactivate the motor when at least one wiper is in the park position.

15. The vehicle wiper system of claim 13, wherein the processor is further configured to detect when the vehicle wiper system is operating in the manual mode.

16. The vehicle wiper system of claim 15, further comprising:
a park sensor for detecting when the at least one wiper is in the park position, wherein the processor is further configured to move the at least one wiper away from the park position if the vehicle wiper system is operating in the manual mode, the at least one wiper is in the park position, and the vehicle is turned off.

17. The vehicle wiper system of claim 16, wherein the processor is further configured to activate the motor for a predetermined length of time to move the at least one wiper away from the park position.

18. A method for controlling a wiper system of a type that can be operated in an automatic mode wherein the wiper system is deactivated automatically and in a manual mode wherein the wiper system is deactivated by a user, the wiper system including at least one wiper configured to move across a windshield of a vehicle, the method comprising:
detecting when the wiper system is operating in the automatic mode;
when the wiper system is operating in the automatic mode and the vehicle is turned off, returning at least one wiper to a park position, and deactivating the wiper system;
detecting when the wiper system is operating in the manual mode;
detecting when the at least one wiper is in the park position; and
when the wiper system is operating in the manual mode, the at least one wiper is in the park position, and the vehicle is turned off, moving the at least one wiper away from the park position.

19. The method of claim 18, wherein the returning step further comprises:
activating a wiper motor to move the at least one wiper toward the park position;
receiving a signal from a park sensor, the park sensor configured to detect when the at least one wiper is in the park position; and
deactivating the wiper motor.

20. The method of claim 18, wherein the step of detecting when at least one wiper is in the park position further comprises receiving a signal from a park sensor, the park sensor configured to detect when the at least one wiper is in the park position.

21. The method of claim 18, wherein the moving step further comprises activating a wiper motor for a predetermined length of time to move the at least one wiper away from the park position.

* * * * *